United States Patent
Jung et al.

(10) Patent No.: US 8,808,587 B2
(45) Date of Patent: Aug. 19, 2014

(54) PREPARATION OF MICROCAPSULE WITH DOUBLE LAYERED STRUCTURE

(75) Inventors: Hyun Min Jung, Daejeon (KR); Yong Seok Kim, Daejeon (KR); Jae Heung Lee, Daejeon (KR); Jong Chan Won, Daejeon (KR); Soon-Ryoung Hur, Gyeongju-si (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 542 days.

(21) Appl. No.: 12/675,700

(22) PCT Filed: Aug. 19, 2008

(86) PCT No.: PCT/KR2008/004797
§ 371 (c)(1),
(2), (4) Date: Feb. 26, 2010

(87) PCT Pub. No.: WO2009/028821
PCT Pub. Date: Mar. 5, 2009

(65) Prior Publication Data
US 2010/0237520 A1    Sep. 23, 2010

(30) Foreign Application Priority Data

Aug. 31, 2007    (KR) .......................... 10-2007-0087986

(51) Int. Cl.
    *B01J 13/02*    (2006.01)
    *B32B 5/16*    (2006.01)
(52) U.S. Cl.
    USPC .................. 264/4.32; 428/402.2; 428/402.21; 428/327; 428/331
(58) Field of Classification Search
    USPC ............ 264/4.23, 4–4.7, 534, 5, 41; 427/331, 427/389.9, 212, 213–213.36, 483, 256; 428/402–402.24, 403, 404, 407, 321.1, 428/474.4; 424/400, 408, 450, 451, 455, 424/93.7, 184.1, 497, 489, 501, 490, 491, 424/492, 493, 494, 495

See application file for complete search history.

(56) References Cited

U.S. PATENT DOCUMENTS 5,804,298 A * 9/1998 Moy .............................. 428/327

FOREIGN PATENT DOCUMENTS

| JP | 05-221817 | 8/1993 |
| KR | 10-2002-0048645 | 6/2002 |
| KR | 10-2004-0048559 | 6/2004 |
| KR | 10-2007-0049379 | 5/2007 |

OTHER PUBLICATIONS

International Search Report dated Feb. 18, 2009 for PCT application No. PCT/KR2008/004797.

* cited by examiner

*Primary Examiner* — James J Seidleck
*Assistant Examiner* — S. Camilla Pourbohloul
(74) *Attorney, Agent, or Firm* — Lowe Hauptman & Ham LLP.

(57) ABSTRACT

The present invention relates to a method of preparing a microcapsule with a double-layered structure which comprises the steps of performing an interfacial polymerization of an amine-aldehyde prepolymer on droplets containing an inorganic metal precursor selected from carboxylate and alkoxide compounds, and hydrolyzing the including inorganic precursors for formation of inorganic inner layer. The method of the present invention can prepare a microcapsule with a double-layered structure of an inorganic inner layer and a polymer outer layer, which is effective for eluting and substituting a core material inside the capsule.

4 Claims, 8 Drawing Sheets

(a)

(b)

PREPARATION OF MICROCAPSULE WITH DOUBLE LAYERED STRUCTURE

CROSS REFERENCE TO RELATED APPLICATION

This application claims the priority of Korean Patent Application No. 10-2007-0087986, filed on Aug. 31, 2007 in the KIPO (Korean Intellectual Property Office), the disclosure of which is incorporated herein in their entirety by reference. Further, this application is the National Phase application of International Application No. PCT/KR2008/004797, filed Aug. 19, 2008, which designates the United States and was published in English. Each of these applications is hereby incorporated by reference in their entirety into the present application.

TECHNICAL FIELD

The present invention relates to a method of preparing a microcapsule with a double-layered structure of an inorganic inner layer and a polymer outer layer, which enables elution and substitution of a core material contained in the microcapsule.

BACKGROUND

There has been known a method for preparing a single-layered microcapsule of polymer comprising the steps of forming a polymer outer layer by performing a polymerization reaction on the surface of a particle having a certain size and degrading or eluting a core material contained therein. In this method, the core material used as a template for forming a capsule can be degraded or eluted only under specific conditions of temperature, pH and a solvent, and thus it is difficult to selectively regulate a material for filling the inside of the particle after the removal of the inner template.

There has been also known another method for preparing a polymer microcapsule where a polymer capsule is formed as a polymer is formed along the interface between droplet surface and a medium by interfacial polymerization using the droplets dispersed in the medium as a core material. Since the selection of a material to fill the inside of the capsule during the capsule polymerization reaction, this method can prepare a polymer capsule containing a certain compound. However, this method has a problem that the core material eluted from the capsule may deform the spherical shape of the capsule, and that the deformed capsules are not able to be introduced with a new compound, thus making it impossible to selectively substitute a core material. Further, in case of forming a thick outer shell to prevent the structural modification of a polymer capsule, it is also not easy to achieve a sufficient elution of a core material.

Meanwhile, for preparing a polymer multi-layered capsule or a polymer-inorganic hybrid multi-layered capsule, there is a method of forming a polymer particle or a polymer capsule and laminating an inorganic precursor or an inorganic particle on the surface thereof, to thereby form a new outer layer on the capsule. Similarly, it is possible to prepare an organic-inorganic multi-layered particle by forming a polymer layer on the surface of an inorganic particle. However, this method has a problem that the polymer outer layer and the inorganic inner layer containing a certain compound inside or having a cavity can be prepared by going through with a very complicated process. That is, they can be prepared by a multi-step process comprising: (a) forming an inorganic layer on the surface of particles of a template, which enables degradation and elution, (b) removing the inner core material, and (c) forming a polymer layer on the surface thereof. However, in such a case, there has not been known any method for selectively containing or substituting an inner core material.

DISCLOSURE

Technical Solution

The present invention has been made in an effort to solve the above-mentioned problems associated with prior art.

In one aspect, the present invention provides a novel method of preparing a microcapsule with a multi-layered structure comprising an inorganic inner layer and a polymer outer layer, which can resolve the problems in conventional methods having structural deformation of particles when a certain compound is encapsulated by substitution into a capsule and eluted therefrom.

The double-layered microcapsule prepared according to the present invention can secure the important property of a functional capsule material essential with respect to delivery and release. Therefore, the present invention provides a method of preparing a target compound selectively contained in the capsule during the preparation of a capsule. Further, when the method of the present invention is applied to a raw material of parts requiring a repetitive action of a capsule material, it can also improve the possibility of maintaining a capsule structure and recycling its function. That is, the polymer outer layer acts to regulate the encapsulation and elution of a core material under certain conditions, and the inorganic inner layer acts as a scaffold for maintaining a particle structure during the encapsulation and elution, to thereby prevent the structural modification and enable re-encapsulation of a core material.

The present invention relates to a method for preparing double-layered microcapsule comprising: 1) dispersing oil droplets containing inorganic precursor selected from carboxylate salts and alkoxide compounds in water with emulsifier; 2) performing an interfacial polymerization of amine-aldehyde prepolymer dissolved in water phase on the surface of the droplets; and 3) hydrolyzing the inorganic precursors inside polymer shell under basic condition to prepare microcapsule comprising a double-layered structure of an inorganic inner layer and a polymer outer layer.

Advantageous Effects

The present invention can easily prepare a microcapsule with a double-layered structure of an inorganic inner layer and a polymer outer layer by two consecutive reactions of interfacial polymerization and hydrolysis of inorganic precursors contained therein in the presence of a basic aqueous solution.

A double-layered microcapsule thus prepared can elute a core material in the presence of a certain solvent and be encapsulated by introducing an external compound into the capsule, which are the characteristics achieved by functioning the inorganic inner layer of the double-layered capsule as a scaffold for maintaining a capsule structure during the substitution of a core material, thereby preventing it from structural deformation. Such characteristics of the double-layered microcapsule according to the present invention are difficult to achieve from a conventional polymer single-layered capsule. Due to these characteristics, the double-layered microcapsule according to the present invention can be effectively used as a drug storage and drug delivery system in a micro size which is capable of introducing and encapsulating a certain compound therein.

DESCRIPTION OF DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
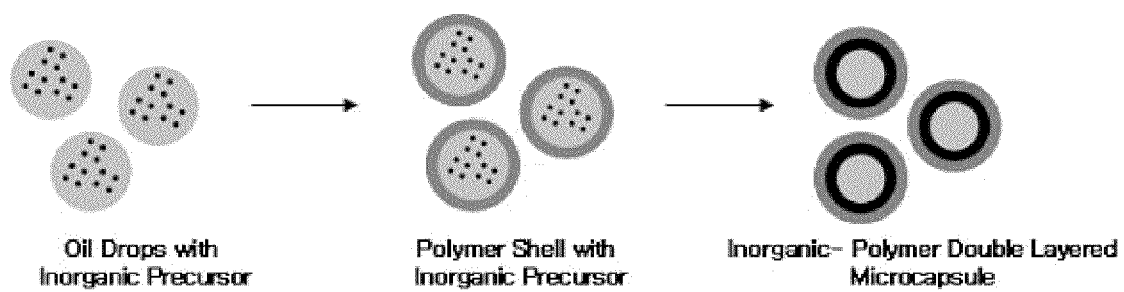
FIG. 1 is a diagram schematically illustrating a method of preparing a double-layered microcapsule according to the present invention.

The present invention relates to a method for preparing a microcapsule with a double-layered structure of an inorganic inner layer and a polymer outer layer by performing an interfacial polymerization reaction on the surface of droplets, wherein each droplet contains an inorganic precursor that is converted to inorganic inner shell by successive hydrolysis. Thus prepared microcapsule can perform the elution of a compound contained within the capsule under certain solvent conditions as the polymer is swollen, and make facilitated the introduction of another compound from the outside into the capsule. At this time, the inorganic inner layer acts as a scaffold for maintaining a microcapsule structure, resulting in preventing the structural breakdown thereof and easily substituting an inner compound.

The microcapsule with a double-layered structure of the present invention can be prepared in an efficiently way by a single-step process without performing a complicate multi-step process. Namely, the method of the present invention prepares polymer microcapsule by introducing an inorganic precursor in advance in an oil droplet used as a core material of a capsule when forming a polymer shell layer according to an interfacial polymerization reaction. Subsequently, the inorganic precursor included within the droplet becomes lost its alkoxy or carboxyl group through a hydrothermal reaction and forms an inorganic oxide by way of a hydroxyl form, leading to the formation of an inorganic inner layer. The double-layered microcapsule having an inorganic inner layer and a polymer outer layer can be prepared by a single reaction in a single reaction container. Further, since the mineralization of an inorganic precursor is only carried out within the polymer outer layer by a hydrolysis reaction, the method of the present invention has several advantages that it is possible to prevent the particles from agglomerating due to condensation and conjugation thereof which are occurred in a conventional method of forming an inorganic layer on the surface of a polymer capsule, and thus, there is no need for another regulation step, for example, of largely diluting the concentration of a particle during the process.

Hereinafter, the method of preparing a microcapsule with a double-layered structure of an inorganic inner layer and a polymer outer layer according to the present invention is described in detail.

First, an inorganic precursor selected from carboxylate salts and alkoxide compounds in oil, and an emulsifier are dispersed in water, to prepare water solution with oil droplets containing an inorganic metal precursor. At this time, the droplet is prepared by dispersing the above ingredients in a size ranging from 100 to 10000 nm at 0 to 50° C. and under pH 3 to 5 with stirring at a rate of 500 to 4000 rpm. If the stiffing rate is slower than 500 rpm, there are problems in that the size of a droplet becomes too big beyond a control range and is not uniform. If the stirring rate is faster than 4000 rpm, it is required an additional apparatus for temperature control and high-speed stirring. Further, in case of deviating from the above pH range, it is preferable that the above range be maintained because a polymer layer is not formed in the step of forming a polymer outer layer.

If the size of a droplet is smaller than 100 nm, it is difficult to form a polymer outer layer containing a droplet inside. If the size thereof is bigger than 10000 nm, instead of forming a stable polymer capsule surrounding a droplet, the polymer capsules are partially formed due to the droplet's instability, which results in agglomeration and precipitation of the capsules. Therefore, it is preferable that the above range be maintained.

There is no limitation to the kind of an emulsifying agent as long as it is the one commonly used in the art. In particular, it is preferable to select the emulsifying agent from the group consisting of poly(styrene-maleic acid) copolymer, polyvinylalcohol and sodium dodecylsulfate, and they may be used alone or as a admixture of two or more. The emulsifying agent can be used in the range of 0.1 to 10 wt % based on the weight of an aqueous solution. If the amount is less than 0.1 wt %, it is difficult to stably maintain droplets. In contrast, if it is more than 10 wt %, it becomes difficult to remove the emulsifying agent. Therefore, it is preferable that the above range be maintained.

As an organic solvent to form oil droplet, it is preferable to use aromatic or aliphatic hydrocarbon which is commonly used in the art and is immiscible with water. Examples thereof may include decane, dodecane, octadecane, hexylbenzene and the like. The organic solvent is used in the range of 5 to 80 wt % based on the weight of an aqueous solution. If the amount is less than 5 wt %, the number of capsule particles obtained in a single reaction becomes too small, thus lowering its reaction efficiency. If it is used more than 80 wt %, it is difficult to form a spherical capsule with a uniform size because the concentration of a droplet is excessively high. Therefore, it is preferable that the above range be maintained.

There is no limitation with respect to the kind of an inorganic precursor as long as it is the one commonly used in the art. In particular, it is preferable to use an inorganic precursor which can be stably in a droplet because it is easily introduced into an organic layer than a water layer. Examples thereof may be selected from carboxylate and alkoxide compounds of a single element or a mixture of at least two kinds selected from the group consisting of alkali metal, alkaline-earth metal, boron(B), aluminum(Al), gallium(Ga), indium(In), titanium(Ti), silicon(Si), germanium(Ge), tin(Sn), lead(Pb), phosphorus(P), arsenic(As), antimony(Sb) and bismuth(Bi). It is preferable to use tetraalkoxysilane, titaniumtetraalkoxide and trialkoxyalkylsilane that have a C1-20 alkoxy group. At this time, the alkyl group preferably includes a vinyl group or an acryl group.

Next, the droplet containing an inorganic metal precursor and an amine-aldehyde prepolymer are subjected to interfacial polymerization reaction, so as to prepare a capsule wherein the polymer is polymerized on the surface of the droplet. Here, the interfacial polymerization reaction is conducted at a temperature of 50 to 100° C. If the temperature is lower than 50° C., the polymerization reaction becomes too slow, while if it exceeds 100° C., there is a risk of boiling the solution and unstabilizing the droplet. Accordingly, it is preferable that the above range be maintained.

There is no limitation with respect to the kind of polymers as long as it is a polymer of an amine compound and an aldehyde compound commonly used in the art. Examples of the amine compound may include a single compound and a mixture of at least two kinds selected from the group consisting of melamine, urea, C1-C10 alkylenediamine, C1-C10 alkylenetriamine, triaminobenzene and diaminobenzene. Examples of the aldehyde compound may include a single compound and a mixture of at least two kinds selected from the group consisting of formaldehyde, acetaldehyde, propylaldehyde, butylaldehyde, benzaldehyde and paraformaldehyde.

The polymer contains the aldehyde compound in the range of 30 to 200 mol % based on the amount of the amine compound. If the content is less than 30 mol %, the cross-linked polymer is not obtained. On the contrary, if it exceeds 200 mol %, there remains excess of unreacted aldehyde.

It is preferable to use the amine-aldehyde prepolymer in the range of 5 to 20 wt % based on the weight of a droplet made of an organic solvent. If the amount is less than 5 wt %, it is unable to form a polymer outer layer sufficient to completely surround all droplets. Meanwhile, if it exceeds 20 wt %, it will result in forming polymer particles which are irrelevant to the droplets, besides the capsule outer layer. Accordingly, it is preferable that the above range be maintained.

Then, inorganic precursor included in the capsule is subjected to hydrolysis under basic conditions, to thereby obtain a microcapsule with a double-layered structure having an inorganic inner layer and a polymer outer layer. Here, the hydrolysis reaction is carried out at a temperature of 50 to 100° C. for 1 to 24 hrs. If the temperature is lower than 50° C., the rate of hydrolysis becomes slow. On the contrary, if it is more than 100° C., there is a risk that the aqueous solution may be boiled, resulting in the change in concentration. Accordingly, it is preferable that the above range be maintained.

In particular, the basic condition refers to a pH range of 7.5 to 14. If the pH is lower than 7.5, the rate of hydrolysis becomes significantly lowered. Meanwhile, if pH is higher than 14 it is very difficult to obtain the basic condition. Accordingly, it is preferable that the above range be maintained. In order to make the basic conditions, the present invention employs ammonia water, sodium hydroxide, potassium hydroxide, sodium carbonate, etc.

As described above, the method of the present invention can prepare a microcapsule with a double-layered structure of an inorganic inner layer and a polymer outer layer. At this time, the inorganic inner layer is a layer selected from the group consisting of an inorganic oxide, a sulfide, a selenide, a nitride and a phosphide, and has a thickness of 20 to 70 nm. The polymer outer layer has a thickness of 30 to 100 nm Here, a core material inside the microcapsule with a double-layered structure according to the present invention is composed of the organic solvent used for the preparation of a droplet.

The microcapsule with a double-layered structure according to the present invention can make facilitated the elution of a core material contained therein and encapsulation of an external material by selectively using a specific solvent without causing any structural deformation of a microcapsule.

The method of the present invention employs an organic solvent, in particular, aromatic or aliphatic hydrocarbon which is immiscible with water, as a core material contained in the microcapsule. In case of using $C_1$-$C_{20}$ aliphatic alcohol, water and $C_1$-$C_{20}$ aliphatic hydrocarbon as a dispersion medium for microcapsule, the organic core contained in the microcapsule is not eluted out. In contrast, in case of using chloroform, dichloromethane, dichloroethane, tetrachloromethane and tetrahydrofuran, it has been observed that an inner core material is eluted from the microcapsule over a period of for 5 min to 1 hr. It has been regarded such a phenomenon is induced as the polymer outer layer is swollen by the solvent and its outer wall's density is decreased, resulting in the penetration of a solvent into the polymer outer layer and the dissolution of a core material.

Since the microcapsule with a double-layered structure according to the present invention can maintain its structure even in such an elution, it is possible to introduce another purposed compound into the inside thereof. Here, in preparing a microcapsule by using octadecane as an organic material being contained therein, if the microcapsule is dispersed in chloroform to elute and remove octadecane, followed by dispersing in a mixture of dodecane and chloroform, dodecane can be introduced into the capsule in the amount of 45 wt % at maximum based on the weight of the microcapsule.

However, in a single-layered polymer capsule without any inorganic inner layer, the polymer outer layer is made up of a thin film with a thickness of about 50 nm, there is a risk that its structure may be deformed while a core material is eluted, which will result in folding of the microcapsule. For example, a melamine-formaldehyde single-layered capsule having no inorganic layer inside shows a structural deformation under elution conditions of a core material regardless of its size in the range of 400 to 10000 nm in diameter, and it is completely folded to change its structure into a hemisphere form. In this case, it was found not possible to introduce a certain compound from an external solution.

EXAMPLES

The following examples illustrate the invention and are not intended to limit the same.

Example 1

In a reactor, poly(styrene-maleic acid) copolymer sodium salt (MW: 120,000, viscosity: 24,000 cps, 30% aqueous solution, content of maleic acid: 50 mol %) 6.6 g as an emulsifying agent was diluted with 45 g of distilled water to a concentration of 5 wt %, and strongly stirred at 600 rpm. Then, octadecane (24 g) and tetraethyl orthosilicate (6 g) were added to the aqueous solution of an emulsifier prepared above, and the resulting mixture was dispersed by using a homogenizer for 10 min in a thermostat at 70, to thereby form a droplet of a core material containing an inorganic precursor. To the droplet was added 20 wt % NaOH and 20 wt % $H_2SO_4$ to adjust its pH to 4.5.

Melamine power (1.98 g), formaldehyde (3.84 g) and distilled water (6.6 g) were added to a 3-neck round bottom flask, and the flask was stirred at 200 rpm for 10 min under nitrogen atmosphere while increasing its temperature to 70, to thereby form a melamine prepolymer (hereinafter, "MF"). To the melamine prepolymer was added the droplet of a core material containing an inorganic precursor, and the resulting mixture was reacted at 70 for 3 hrs, to thereby obtain an MF-capsule. The MF-capsule containing an inorganic precursor prepared above was separated from the aqueous solution by centrifugation and subjected to purification three times which comprises the steps of washing with hexane and ethanol and centrifuging. Then, the purified MF-capsule was dried into powder by using a freeze dryer.

The MF-capsule containing an inorganic precursor was subjected to hydrolysis under basic conditions, to prepare a melamine-formaldehyde (MF) capsule having a $SiO_2$ inner layer. After the MF-capsule containing an inorganic precursor was dispersed in distilled water, 6 wt % aqueous ammonia solution was added thereto to prepare basic conditions, and the dispersion was matured at 70 for 24 hrs, to thereby obtain an MF-capsule having a $SiO_2$ inner layer. Thus prepared MF-capsule having a $SiO_2$ inner layer was subjected to purification three times which comprises the steps of washing with ethanol and distilled water and centrifuging. The purified MF-capsule having a $SiO_2$ inner layer was dried into powder by using a freeze dryer.

Figure 2:
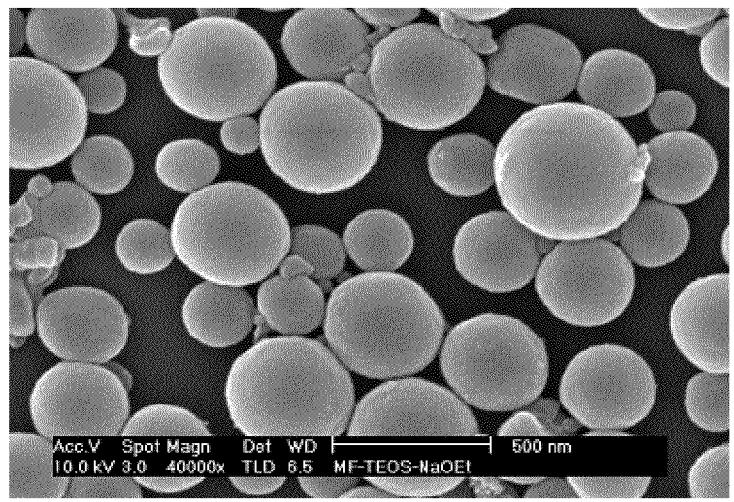
FIG. 2 are photographs of a double-layered microcapsule prepared in Example 1 according to the present invention observed with a scanning electron microscope (SEM)(a) and a transmission electron microscope (TEM)(b), respectively.
Figure 2:
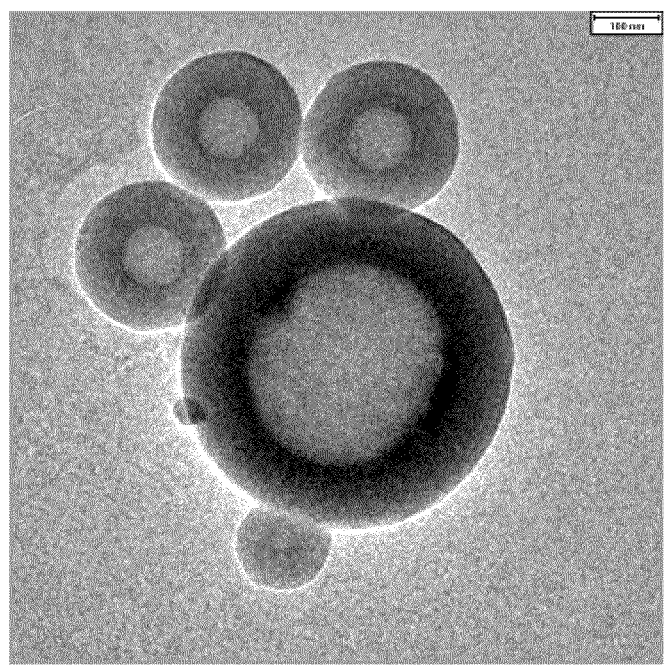

As shown in FIG. 2, thus prepared microcapsule with a double-layered structure of a $SiO_2$ inner layer and an MF outer layer was observed with an electron scanning microscope (SEM) its shape and size. Further, it has been confirmed with a transmission scanning microscope (TEM) that the $SiO_2$ inner layer is successfully formed inside the microcapsule.

Example 2

The melamine-formaldehyde (MF) capsule was prepared according to the same method as described in Example 1 except that the MF-capsule containing a $SiO_2$ inner layer was dispersed in chloroform (microcapsule content: 5 wt %) instead of distilled water and subjected to sonication for 30 min. Then, the MF-capsule was subjected to purification by washing with hexane and ethanol and centrifuging three times and dried with a freeze dryer, to thereby prepare a microcapsule with a double-layered structure of a $SiO_2$ inner layer and an MF outer layer.

Example 3

The melamine-formaldehyde (MF) capsule was prepared according to the same method as described in Example 1 except that the MF-capsule containing a $SiO_2$ inner layer was dispersed in a mixture of chloroform and dodecane (2:1 v/v) instead of distilled water and chloroform was removed by evaporated under reduced pressure for 10 min. Then, the MF-capsule was subjected to purification by washing with hexane and centrifuging three times and dried with a freeze dryer, to thereby prepare a microcapsule with a double-layered structure of a $SiO_2$ inner layer and an MF outer layer.

Example 4-7

The microcapsule with a double-layered structure was prepared according to the same method as described in Example 1 except that the inorganic precursors and polymers shown in Table 1 were used instead of using tetraethyl orthosilicate as an inorganic precursor and melamine-formaldehyde as a polymer.

TABLE 1

| | Inorganic precursor (g) | polymer (g) |
|---|---|---|
| Example 4 | tin(II) ethoxide (6 g) | melamine-formaldehyde resin 2 g |
| Example 5 | tin tetraoctanoate (6 g) | melamine-formaldehyde 2 g |
| Example 6 | titanium tetraoctanoate (6 g) | melamine-formaldehyde 2 g |
| Example 7 | tetraethyl orthosilicate (6 g) | urea-formaldehyde 1.8 g |

Comparative Example 1

The melamine-formaldehyde (MF) single-layered microcapsule was prepared according to the same method as described in Example 1 except that tetraethyl orthosilicate was not used as an inorganic precursor, and octadecane was used to form an inner core material.

Comparative Example 2

The melamine-formaldehyde (MF) single-layered microcapsule was prepared according to the same method as described in Comparative Example 1 except that the MF-capsule was dispersed in a chloroform solution instead of distilled water and subjected to sonication for 30 min. Then, the MF-capsule was subjected to purification by washing with hexane and ethanol and centrifuging three times and dried with a freeze dryer, to thereby prepare a microcapsule with a single-layered structure.

Comparative Example 3

The melamine-formaldehyde (MF) single-layered microcapsule was prepared according to the same method as described in Comparative Example 1 except that the MF-capsule was dispersed in a mixture of chloroform and dodecane (2:1 v/v) instead of distilled water and chloroform was removed by evaporated under reduced pressure for 10 min. Then, the MF-capsule was subjected to purification by washing with hexane and centrifuging three times and dried with a freeze dryer, to thereby prepare a microcapsule with a single-layered structure.

Test Example

Physical properties of the microcapsule prepared in Examples 1 to 3 and Comparative Examples 1 to 3 were measured and shown in Table 2. In particular, the content of a core material contained in the microcapsule was measured with a differential scanning calorimetry (DSC), and each thickness of an inner layer and an outer layer was measured with a transmission electron microscope (TEM).

Figure 3:
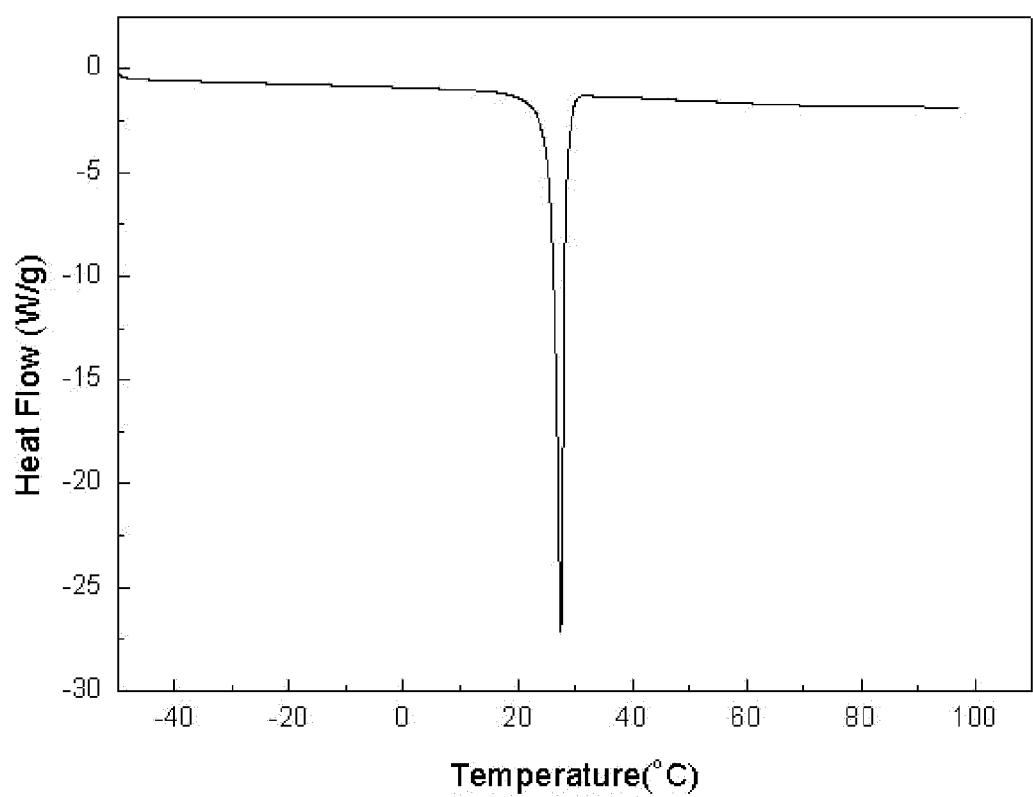
FIG. 3 is the result of analysis for microcapsule prepared in Example 1 according to the present invention with a differential scanning calorimetry (DSC)
Figure 4:
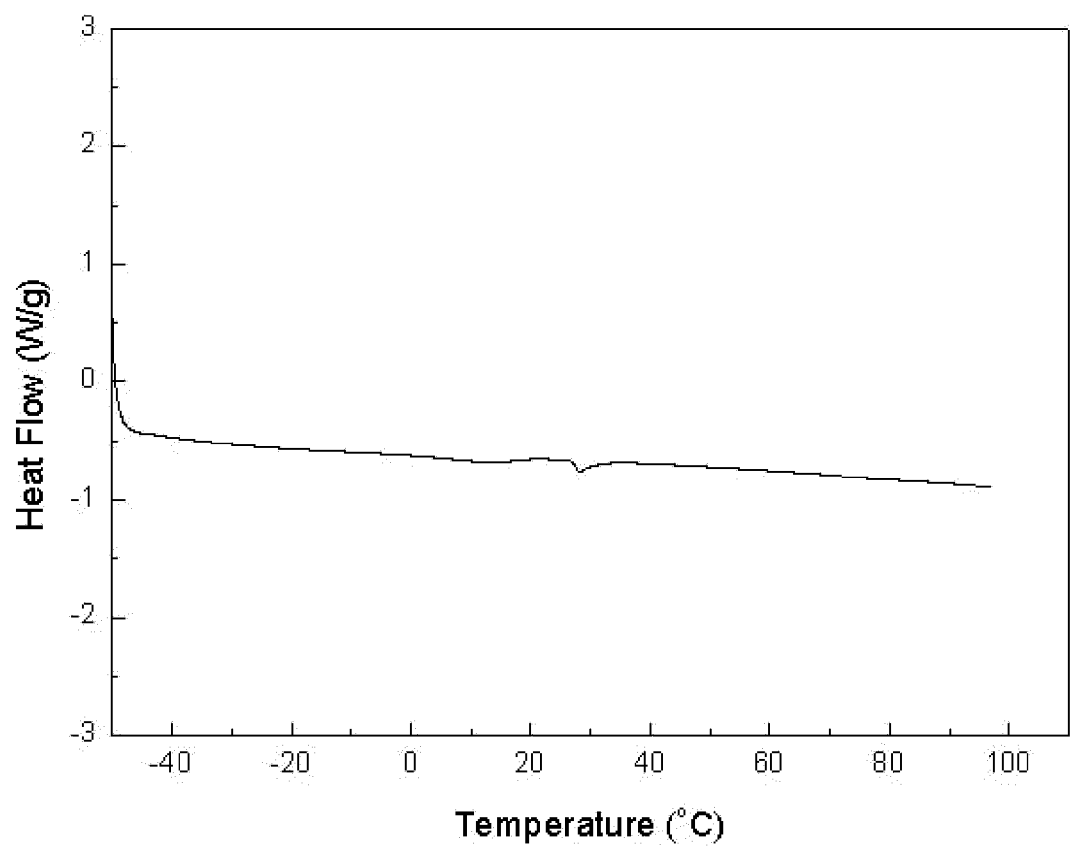
FIG. 4 is the result of analysis for microcapsule prepared in Example 2 according to the present invention with a differential scanning calorimetry (DSC)
Figure 5:
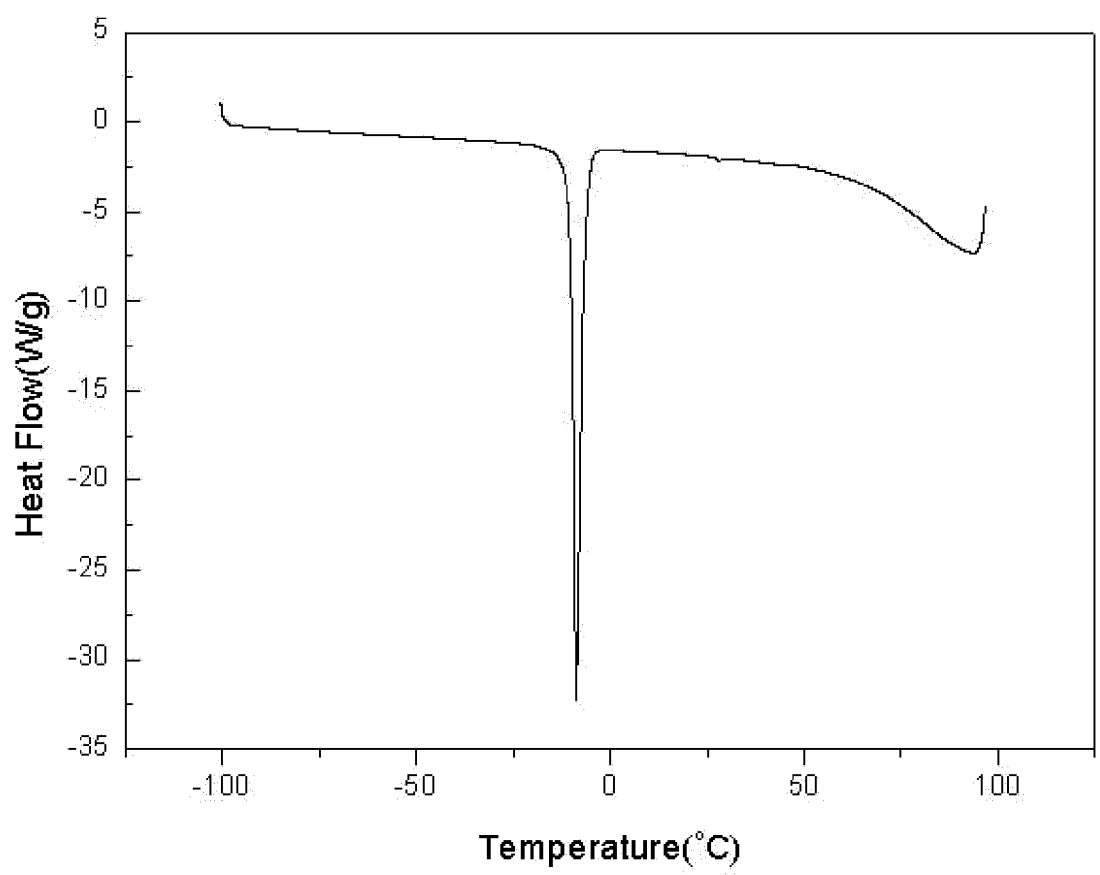
FIG. 5 is the result of analysis for microcapsule prepared in Example 3 according to the present invention with a differential scanning calorimetry (DSC)
Figure 6:
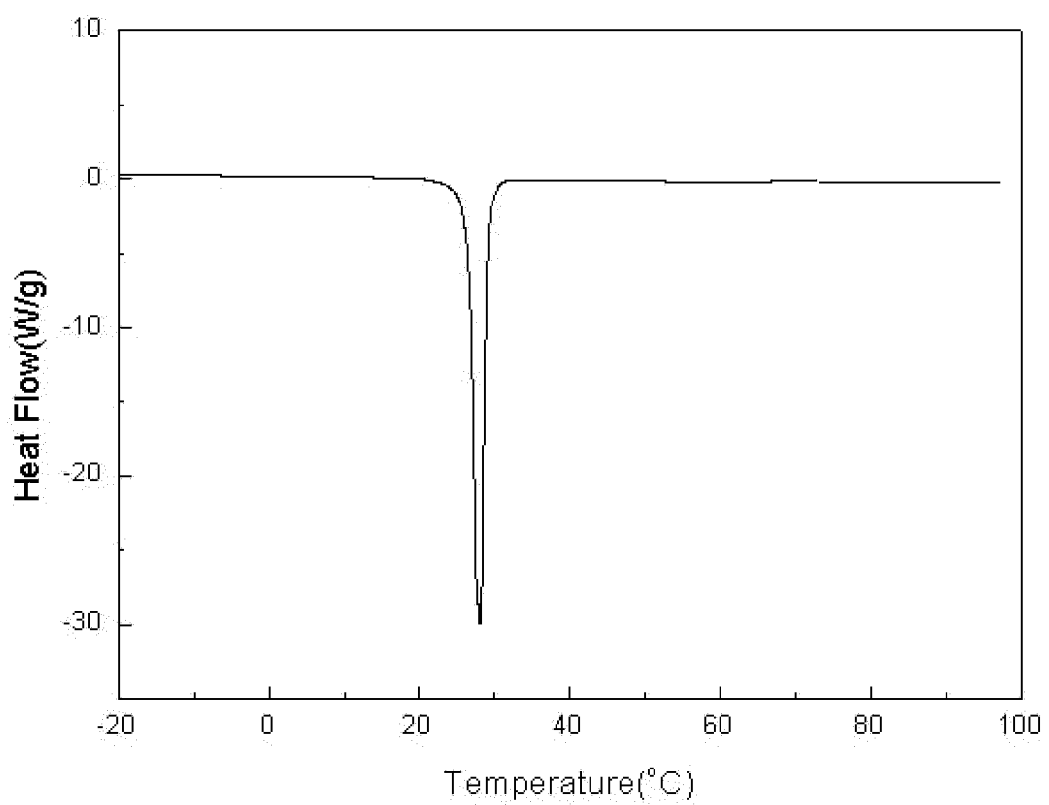
FIG. 6 is the result of analysis for microcapsule prepared in Comparative Example 1 with a differential scanning calorimetry (DSC)
Figure 7:
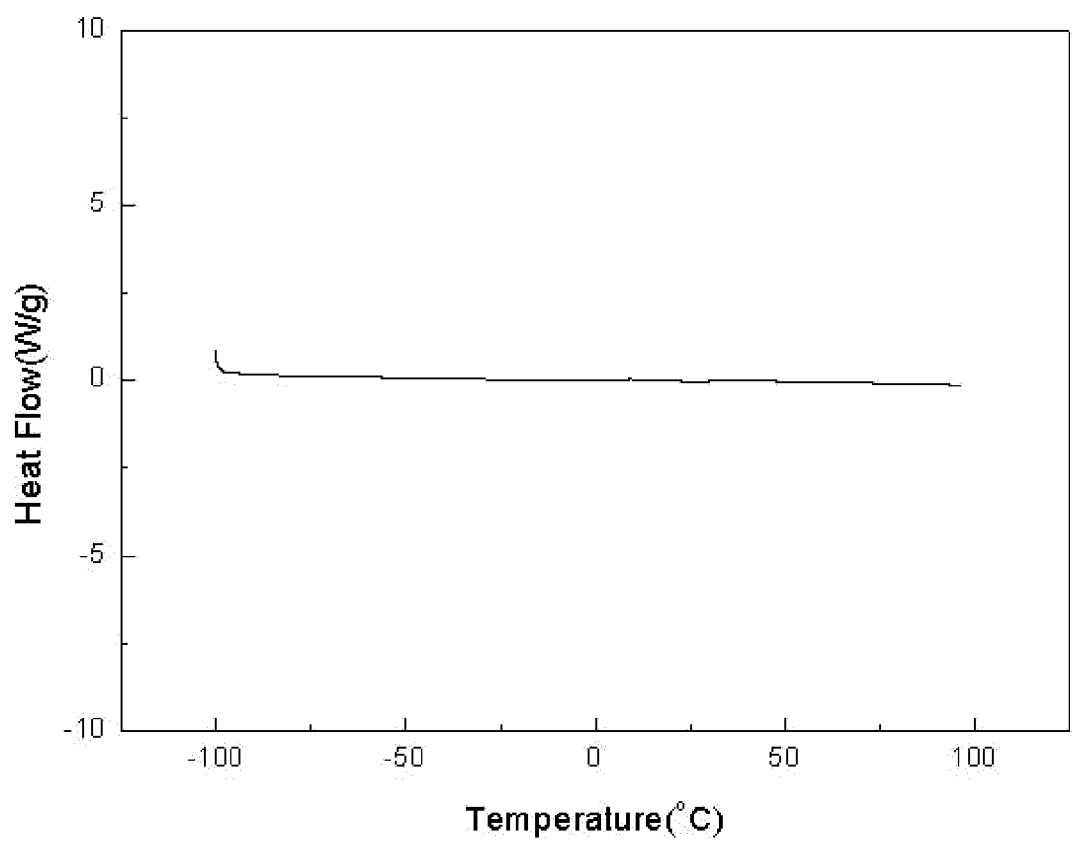
FIG. 7 is the result of analysis for microcapsule prepared in Comparative Example 2 with a differential scanning calorimetry (DSC)
Figure 8:
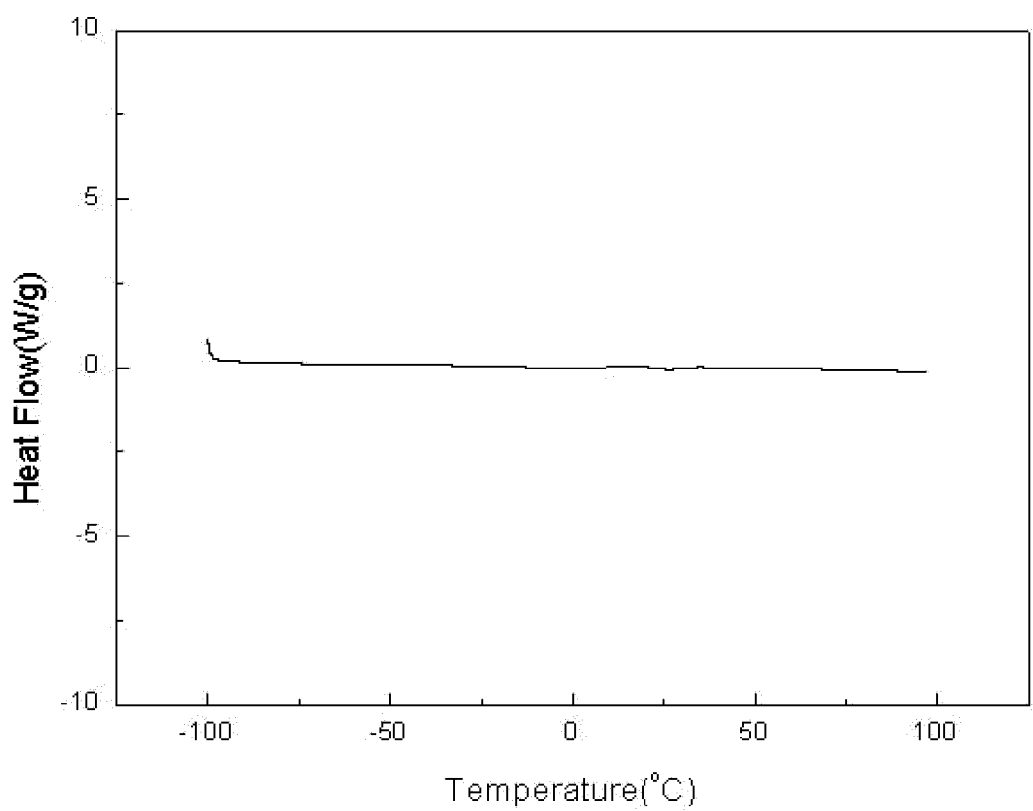
FIG. 8 is the result of analysis for microcapsule prepared in Comparative Example 3 with a differential scanning calorimetry (DSC).

At this time, the results of analyzing with a differential scanning calorimetry are shown in FIGS. 3 to 8, wherein FIG. 3 is for Example 1, FIG. 4 for Example 2, FIG. 5 for Example 3, FIG. 6 for Comparative Example 1, FIG. 7 for Comparative Example 2, and FIG. 8 for Comparative Example 3.

TABLE 2

| | Layer thickness (nm) | | Content of core material (wt %) | |
|---|---|---|---|---|
| | inner layer | outer layer | octadecane | dodecane |
| Example 1 | 40 | 60 | 60 | — |
| Example 2 | 40 | 60 | 1 | — |
| Example 3 | 40 | 60 | 1 | 45 |
| Comparative Example 1 | — | 65 | 80 | — |
| Comparative Example 2 | — | 65 | 0.3 | — |
| Comparative Example 3 | — | 65 | 0.3 | 0 |

As shown in Table 2, as a result of comparing the microcapsules with a double-layered structure of an inorganic inner layer and a polymer outer layer according to the present invention prepared in Examples 1 to 3 with the microcapsules with a single-layered structure of a melamine resin layer prepared in Comparative Examples 1 to 3 with respect to their input/output of a core material, it was found that the core material is substituted only in the microcapsule with a double-layered structure.

Based on the unique phase change properties of a core material in the microcapsule, an endothermic peak depending on phase change was observed in the DSC spectrum of the microcapsule. In this Test Example, each ingredient and content of octadecane and dodecane was calculated from each peak corresponding to octadecane and dodecane by using the following equation 1.

$$\text{Encapsulated core content (\%)} = \frac{\Delta Hm(\text{Heat of fusion for particle})}{\Delta H°m(\text{Heat of fusion for pure } PCM)} \times 100 \quad \text{[Equation 1]}$$

$$(\Delta H°m = 243 \text{ J/g for } PCM)$$

(PCM: phase change material, a core material of a capsule)
H°m=243 J/g (octadecane)
H°m=216 J/g (dodecane)

The microcapsule with a double-layered structure prepared in Example 1 showed a significantly reduced content of octadecane from 60 wt % to 1 wt % due to the removal of inner octadecane in Example 2. Further, as a result of treating in Example 3, dodecane was reintroduced into the inside the microcapsule, and thereby, the content of dodecane contained in the microcapsule was 45 wt %. Based on the facts that the melting point of octadecane and dodecane is 28 and −10, respectively, it was found in the DSC spectrum of FIG. 5 that octadecane contained in the microcapsule as a core material was substituted with dodecane.

Meanwhile, when the results shown in Comparative Examples 1 to 3 were analyzed, it has been found that as can be seen in Comparative Example 2 and FIG. 7, octadecane contained in the microcapsule is removed, while as can be seen in Comparative Example 3 and FIG. 8, it is unable to introduce again external dodecane into the microcapsule. The observation of the microcapsule under a scanning electron microscope and a transmission electron microscope after the treatment of Comparative Example 2 revealed that the microcapsule does not form an inner cavity due to the structural deformation, thus making it impossible to introduce an external compound into the inside thereof.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The invention claimed is:

1. A method of preparing a double-layered microcapsule comprising:
   dispersing an inorganic precursor selected from carboxylate salts and alkoxide compounds in organic solvents with an aqueous solution of an emulsifier, to prepare droplets containing an inorganic precursor in an aqueous solution;
   performing an interfacial polymerization of amine-aldehyde prepolymer on the droplet containing an inorganic precursor to prepare a capsule in which the polymer is polymerized on the surface of the droplets; and
   hydrolyzing the inorganic precursor in the capsule under basic conditions to prepare a microcapsule with a double-layered structure comprising an inorganic inner layer and a polymer outer layer, wherein the hydrolysis reaction is carried out at a temperature of 50 °C. to 100 °C. for 1 to 24 hours under a pH range of 7.5 to 14, the inorganic inner layer has a thickness of 20 nm to 70 nm, and the polymer outer layer has a thickness of 30 nm to 100 nm.

2. The method according to claim 1, wherein the inorganic precursor is selected from carboxylate and alkoxide compounds of a single element or a mixture of at least two kinds selected from the group consisting of alkali metal, alkaline-earth metal, boron(B), aluminum(Al), gallium(Ga), indium (In), titanium(Ti), silicon(Si), germanium(Ge), tin(Sn), lead (Pb), phosphorus(P), arsenic(As), antimony(Sb) and bismuth (Bi).

3. The method according to claim 1, wherein the polymer is a copolymer of an aldehyde compound and an amine compound of a single compound or a mixture of at least two kinds selected from the group consisting of melamine, urea, C1-C10 alkylenediamine, C1-C10alkylenetriamine, triaminobenzene and diaminobenzene.

4. The method according to claim 1, wherein the inorganic inner layer is a layer selected from the group consisting of an inorganic oxide, a sulfide, a selenide, a nitride and a phosphide.

* * * * *